(12) United States Patent
Nagashima et al.

(10) Patent No.: US 6,436,516 B1
(45) Date of Patent: Aug. 20, 2002

(54) INFORMATION SEAL

(75) Inventors: Takeshi Nagashima; Maki Tanaka, both of Tokyo (JP)

(73) Assignee: Sega Enterprises, Ltd., Tokyo (JP)

( * ) Notice: Subject to any disclaimer, the term of this patent is extended or adjusted under 35 U.S.C. 154(b) by 0 days.

(21) Appl. No.: 09/359,380

(22) Filed: Jul. 23, 1999

(30) Foreign Application Priority Data

Jul. 27, 1998 (JP) .......................................... 10-210804

(51) Int. Cl.[7] .............................. B32B 3/00; B32B 7/14
(52) U.S. Cl. ...................... 428/201; 428/203; 428/209; 428/901
(58) Field of Search .................. 428/201, 203, 428/209, 901

(56) References Cited

U.S. PATENT DOCUMENTS 5,920,290 A * 7/1999 McDonough et al. ....... 343/873
6,018,299 A * 1/2000 Eberhardt ................. 340/572.7
6,107,921 A * 8/2000 Eberhardt et al. ........ 340/572.7
6,121,880 A * 9/2000 Scott et al. ............... 340/572.5
6,133,835 A * 10/2000 De Leeuw et al. ...... 340/572.5

* cited by examiner

Primary Examiner—Bruce H. Hess
Assistant Examiner—B. Shewareged
(74) Attorney, Agent, or Firm—Dickstein Shapiro Morin & Oshinsky LLP

(57) ABSTRACT

Information of a product for an information seal to be adhered to is printed on an information side of the information seal. An adhesive for adhering the information seal to the product is applied to a pattern side of the information seal, and a conduction pattern corresponding to a serial number is further formed on the pattern side. The conduction pattern includes a required number of terminals opposed to each other, and lines interconnecting those of the opposed terminals required to indicate the serial number indicated on the information side.

2 Claims, 6 Drawing Sheets

INFORMATION SEAL

BACKGROUND OF THE INVENTION

The present invention relates to an information seal for clearly indicating various information of products, such as serial numbers, ID numbers, area codes, etc., more specifically information seal from which the various information can be read on the side of products with the information seal adhered to.

Generally seals with serial numbers, etc. printed on are adhered to parts, e.g., the back sides of domestic electric products, typically television sets, audio sets,. etc., for possible later product administration and guarantee, and maintenance. However, the information of the seals is indicated to be read visually by human eyes. The information can not be correctly read or is unreadably due to smear states.

On the other hand, increased numbers of electronic apparatuses, such as video game machines, personal computers, etc. have information, such as serial numbers, ID numbers, etc., specifically assigned to the apparatuses electrically recorded in the memories, such as EEP-ROM, etc., incorporated in the electronic apparatuses.

However, it can not help saying that recording product information in devices, such as memories, etc., thus built in the electronic apparatuses take much labor and cost unsuitably for inexpensive mass-production. If the product information is recorded in such way, usually the information recorded in memories, such as EEP-ROM, etc., can not be read without putting the electronic apparatuses in operation. The information can not be read when the electronic apparatuses themselves malfunction. Accordingly, in malfunctions, etc., it will take time and labor to read the information, and finding causes and countermeasures will be delayed.

SUMMARY OF THE INVENTION

An object of the present invention is to provide an information seal from which permits information, such as serial numbers, ID numbers, areal codes, etc., to be easily read both electrically and visually.

The above-described object is achieved by an information seal comprising information recorded visibly on one side of a sheet, and a conduction pattern formed on the other side of the sheet, which corresponds to the information.

Operators can visually confirm the information by means of the visible information clearly indicated on one side of the information seal, and the information can be electrically read by the conduction pattern formed on the other side of the information seal.

In the above-described information seal it is possible that an adhesive for adhering the information seal to a product is applied to the other side of the sheet. The information seal can be easily adhered to a product.

In the above-described information seal it is possible that the conduction pattern includes a plurality of sets of terminal patterns opposed to each other, and a connection pattern interconnecting the terminal patterns of a required one of the sets corresponding to the information. Depending on which of a plurality of sets of opposed terminal patterns are interconnected with each other, various product information can be indicated.

In the above-described information seal it is preferable that the information is one of a serial number of the product for the information seal to be adhered to, an ID number and an areal code, or a combination of them.

In the above-described information seal it is possible that visible information is formed on said one side.

In the above-described information seal it is possible that the sheet is transparent; the visible information is formed on said the other side of the sheet; and the information is visible through the sheet from the side of said one side of the sheet. The information can be visually recognized through the transparent sheet on the side of one side of the sheet.

In the above-described information sheet it is possible that the visible information is formed of a letter and/or a visible code. The information can be read by reading devices.

As described above, according to the present invention, visible information is clearly indicated on one side of the information seal, and a conduction pattern which is electrically readable is provided on the other side of the information seal, whereby the visible information can be visually read, and the information can be electrically read by the conduction pattern. Accordingly, the information seal is very useful in electrically processing product information by computers. The conduction pattern of the information seal can be mass-produced, and the information seal with the conduction pattern can be easily adhered to by simple operations, whereby labor and costs can be drastically reduced in comparison with cases where memories, such as the conventional EEP-ROM, etc. are used. Furthermore, when the information seal is damaged by a cause, or information recorded on the information seal must be changed due to a reason, the information seal is simply replaced.

BRIEF DESCRIPTION OF THE DRAWINGS

FIG. 2 is a view diagrammatically showing a personal computer as one example of objects for the information seal according to the embodiment of the present invention to be adhered to.

FIG. 3 is a broken perspective view of a ROM cartridge of game software as another example of objects for the information seal according to the embodiment of the present invention to be adhered to.

FIG. 4 is a view showing another example of contact patterns provided on an object for the information seal according to the embodiment of the present invention to be adhered to.

DETAILED DESCRIPTION OF THE INVENTION

Figure 1A:
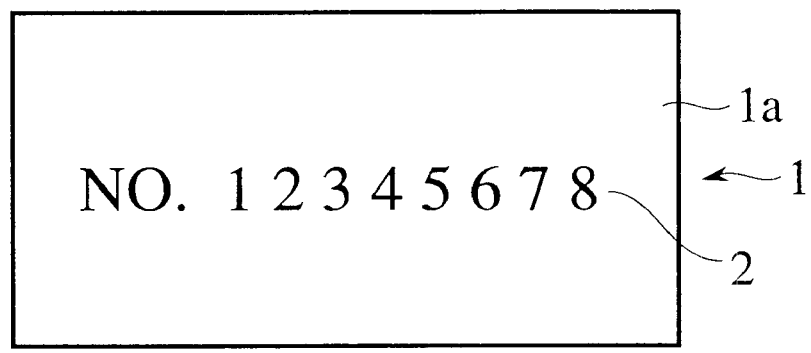
FIGS. 1A and 1B are appearance views of the information seal according to one embodiment of the present invention.
Figure 1B:
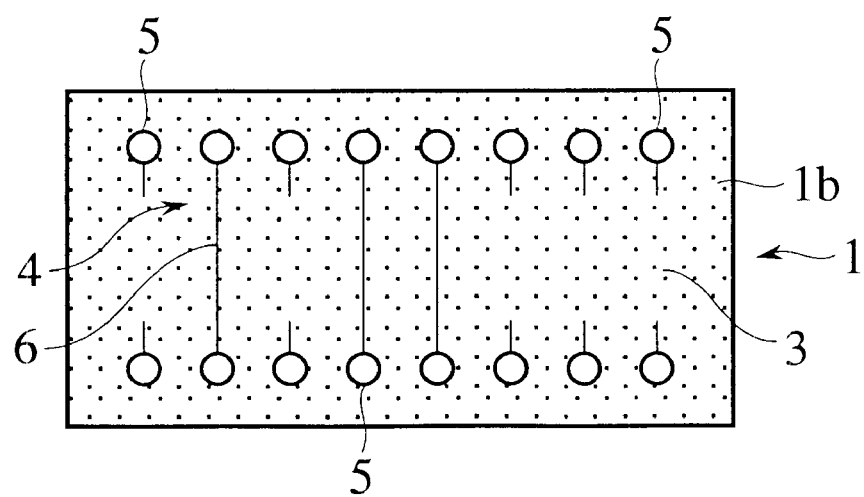

The information seal according to one embodiment of the present invention will be explained with reference to FIG. 1. FIG. 1 is views showing an information seal according to the present embodiment. FIG. 1A shows an information side of the information seal. FIG. 1B shows the pattern side of the information seal.

The information seal 1 is formed of, e.g., polyethylene sheet. On the information side 1a shown in FIG. 1A, information of a product for the information seal to be adhered to, e.g., a serial number 2, is printed. On the pattern side shown in FIG. 1B, an adhesive 3 for adhering the information seal 1 to the product is applied to. A conduction pattern 4 corresponding to the serial number 2 is formed further on the pattern side 1b. The conduction pattern 4 is formed by, as exemplified in the drawing, a required number of terminal patterns 5 opposed to each other, and connection patterns 6 for interconnecting those of the opposed terminal patterns 5, which are required to display the serial number 2 indicated on the information side 1a.

Figure 2:
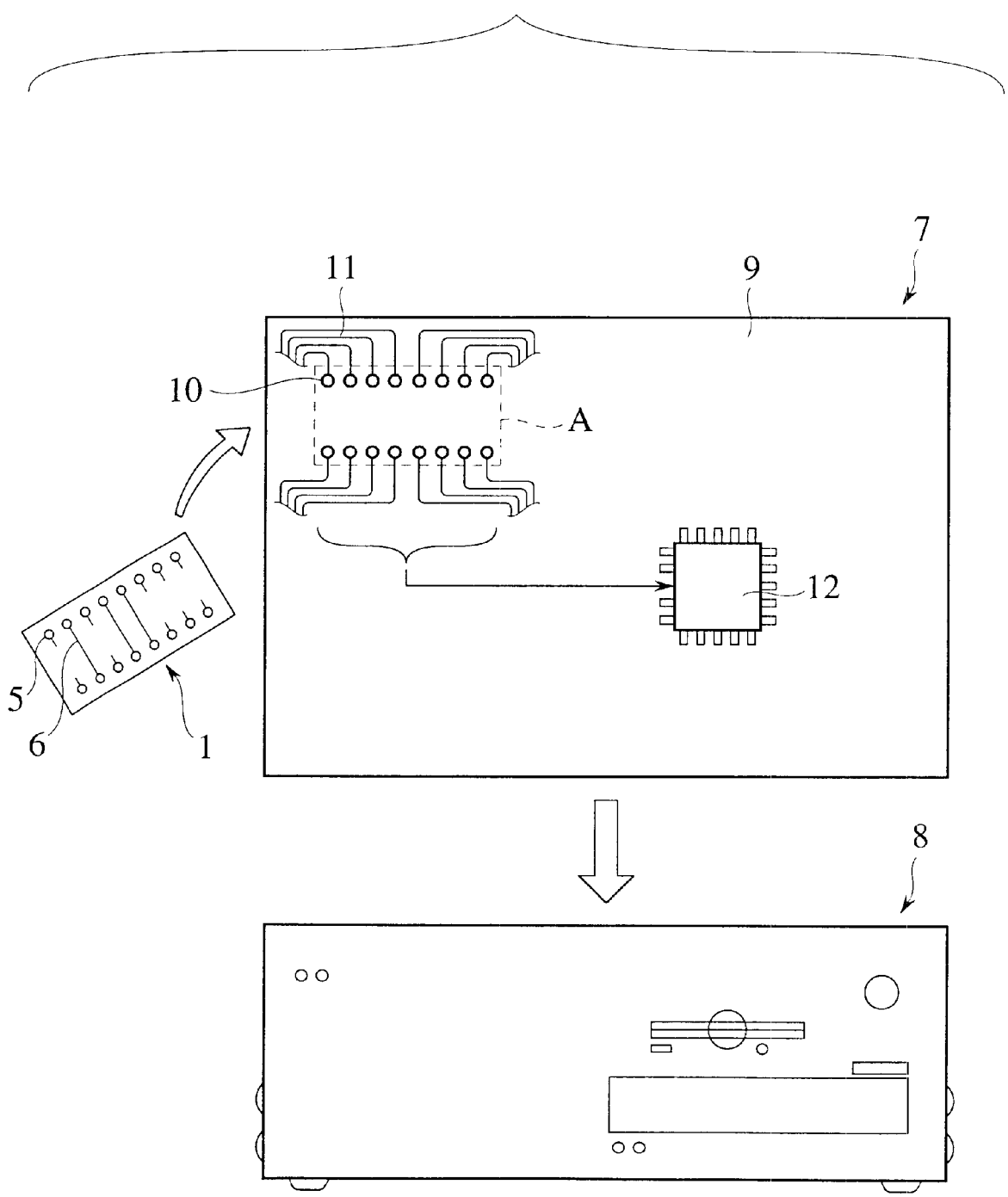

FIG. 2 diagrammatically shows a personal computer as one example of objects to which the information seal 1 according to the present embodiment is to be adhered to.

An expansion board 7 adds new functions to the personal computer 8 or reinforces functions already guilt in the personal computer 8. The expansion board 7 is connected the personal computer 8 to thereby expand the functions of the personal computer 8. Only parts of the expansion board 7 which are relevant to the present embodiment are shown, but circuits and devices of the expansion board 7 are omitted.

The expansion board 7 has a region A for the information seal 1 to be adhered to allocated on a circuit substrate 9. Contacts 10 corresponding to the respective terminal patterns 5 on the pattern side 1b of the information seal 1 are provided in the region A. The contacts 10 are electrically connected to a control IC 12 through wiring patterns 11 provided on the circuit substrate 9. The control IC is arranged so as to be electrically connected to a circuit (not shown) of the personal computer 8 when the expansion board 7 is connected to the personal computer 8.

The information seal 1 is mechanically or manually adhered to the region A when the expansion board A is fabricated or shipped, whereby firstly the information, such as a serial number or others, is recognizable visually from the outside, and secondly the required opposed contacts 10 on the circuit substrate 9 are electrically connected through the associated connection patterns 6. Accordingly, the region A of the expansion board 7 is visually watched to recognize the information, such as a serial number or others while the expansion board 7 is connected to the personal computer. 8, whereby the information, such as a serial number or others, presented by the conduction pattern 4 on the pattern side 1b can be read int eh personal computer 8 through the control IC 12.

In the present embodiment, the information is read through the control IC 12 mounted on the circuit substrate 9 of the expansion board 7, but the information on the pattern side 1b may be read by the circuit of the personal computer 8.

Figure 3:
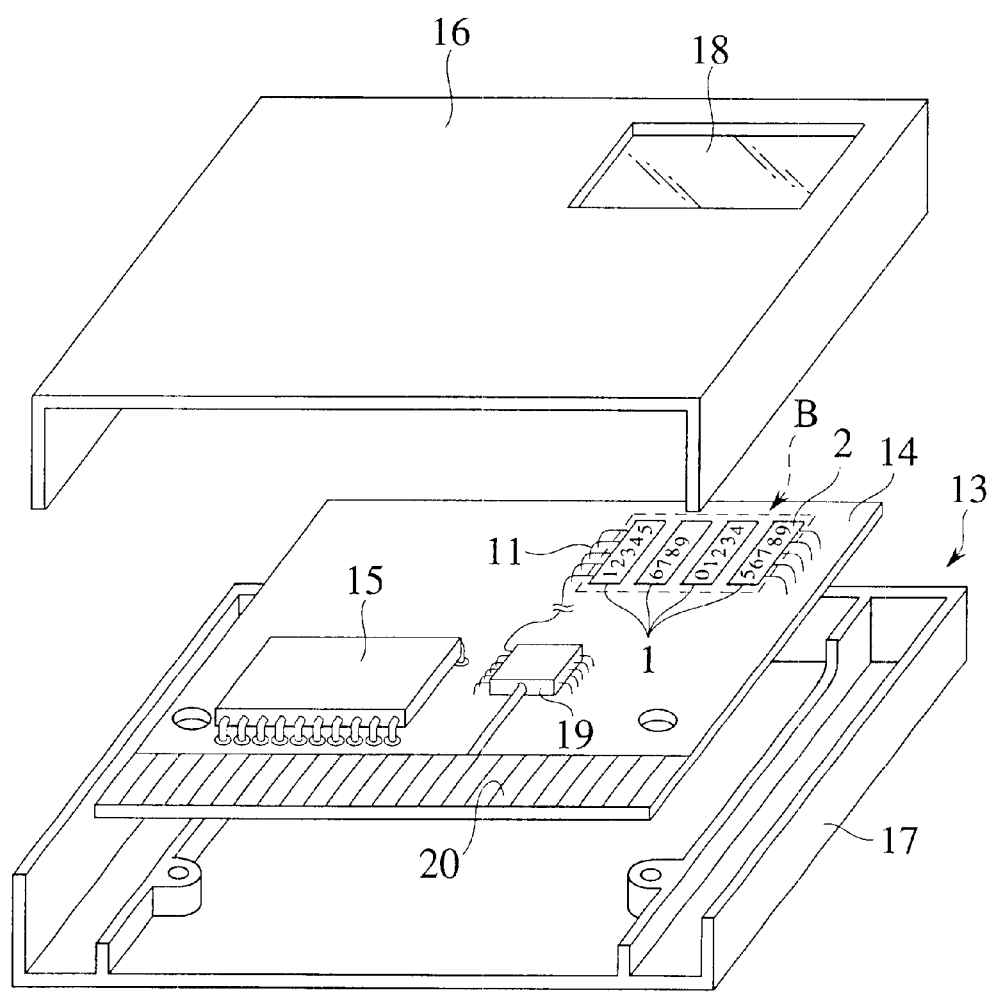

FIG. 3 shows a ROM cartridge for game software as another example of objects for the information seal 1 according to the present embodiment to be adhered to.

The ROM cartridge 13 is loaded into a game apparatus (not shown). The body of the ROM cartridge 13 is in the form of a casing formed by combining an upper shell 16 and a lower shell 17. A window 18 is formed in the upper shell 17 to allow product information (e.g., a serial number) of a ROM substrate 14 to be visually recognized without disassembling the cartridge 13. A region B for the information seal to be adhered to is defined on the ROM substrate 14. A number of sets of seal contacts (not shown) are provided on the ROM substrate 14 in the region B. The information seal 1 is adhered to the respective seal contacts.

When the information seal 1 is adhered to, the seal contacts are interconnected with each other by the connection patterns 6 of the information seal 1. The seal contacts are electrically connected to the control IC 19 through wiring pattern 11 on the ROM substrate 14. The control IC 19 is electrically connected to a circuit on a reading side through a terminal 20 when the cartridge 12 is loaded into the game apparatus not shown or a device specialized in reading the serial number.

In the present embodiment, the information seal is mechanically or manually adhered to the ROM substrate 14 in the region B in the step of fabricating the ROM substrate 14 ro setting the ROM substrate 14, whereby the information of the ROM substrate can be visually recognized through the window, as required, can be electrically read through the game apparatus or others.

In the present embodiment, the electrical information reading is conducted through the control 19, but may be connected directly to the terminal 20. In FIG. 3, the information of the ROM substrate 14 is indicated by 4 sheets of seal, but a number of adhered sheets of seal depends on information and is not limited to 4 sheets.

Figure 4:
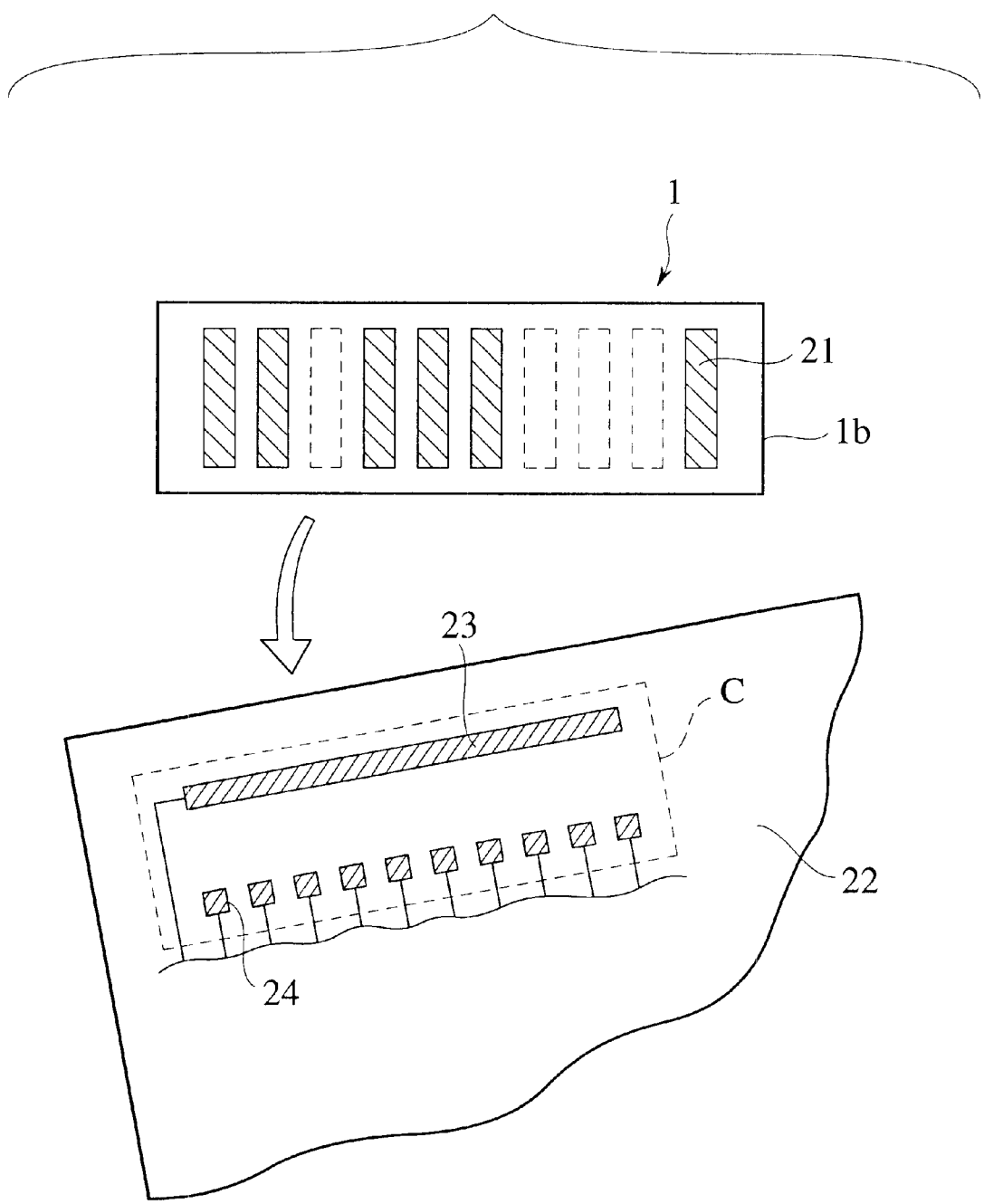

FIG. 4 shows another example of conduction patterns of the information seal, and another example of contact patterns of the side of the information seal t be adhered to.

The information seal 1 has band-shaped conduction patterns 21 printed on the pattern side 1b. On a substrate 22 for the information seal 1 to be adhered to in a region C there are formed a common band-shaped terminal 23, and a plurality of terminals 24 formed opposed to the band-shaped terminal 23. When the information seal 1 is adhered to the region C, required contacts 24 on the substrate 23 are electrically connected to the associated band-shaped conductors 21 of the information seal 1, whereby information of the substrate can be read in the same way as described above.

The information seal 1 according to the present embodiment indicates visible information on one side 1a and has electrically readable conduction patterns formed on the other side 1b, whereby the visible information can be visually read by the eyes, and the information can be electriclaly by the conduction patterns.

The present invention is not limited to the above-described embodiment anc can cover other various modifications.

Figure 5:
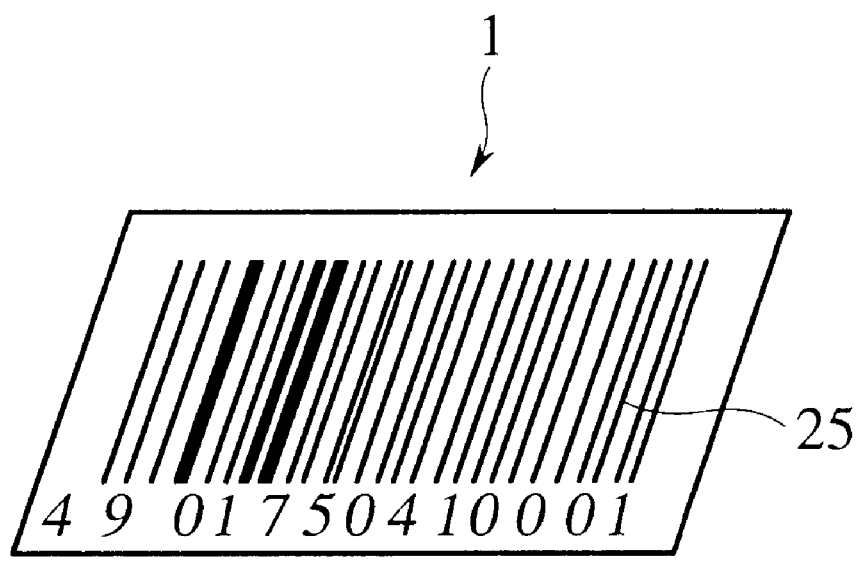
FIG. 5 is an perspective appearance view of the information seal according to another embodiment of the present invention.

In the above-described embodiment the information seal carries a serial number of the product, etc., but may be toher information, such as ID number used in communications, etc., an areal code defining a receiver of a product, a use of the product or the like, or others, or a combination of such information. The indication of the visible information is not limited to numbers and may be forms, such as the bar code 25, exemplified in FIG. 5, which are read by a specific reading device (bar code reader). A visible code, such as Calra Code or others, other than the bar code 25 may be used.

Figure 6A:
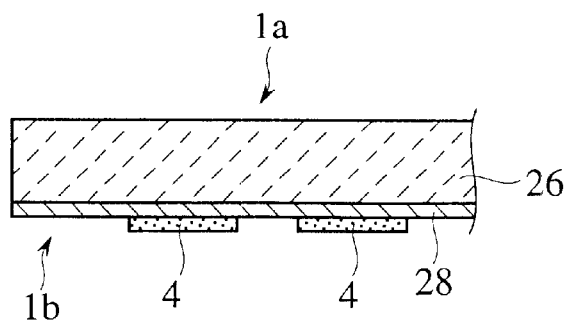
FIGS. 6A, 6B, and 6C are sectional views of the information seal according to yet another embodiment of the present invention.

In the above-described embodiment visible information is printed on the information side 1a of the information seal 1, but as shown in FIG. 6A, the information seal 1 may be formed of a transparent sheet 26, an opaque indication layer formed on the back side 1b of the transparent sheet 26 and having visible information, such as a serial number or others provided thereon, and conduction patterns 4 provided on the indication layer 28. The visible information, such as a serial number or others is clearly indicated on the information side 1a through the transparent sheet 26. The indication layer 28 with the visible information, such as a serial number or others, provided on is sandwiched by the transparent sheet 26 and an object for the information seat 1 to be adhered to, whereby the effect of improved resistance for abrasion and transient changes can be expected. The indication layer 28 may be transparent.

Figure 6B:
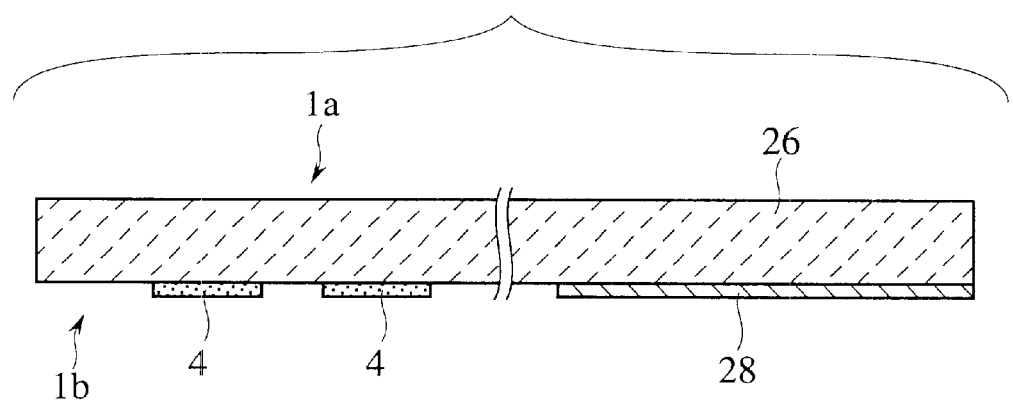

It is also possible that as shown in FIG. 6B, a region for the information seal 1 is divided, and conduction patterns 4 are provided on the back side 1b in one of the divided regions, and in the other one of the divided regions the indication layer 28 indication visible information is provided. The visible information and also the conduction patterns 4 can be seen through the transparent sheet 6 on the side of the information side 1a of the information seal 1.

Figure 6C:
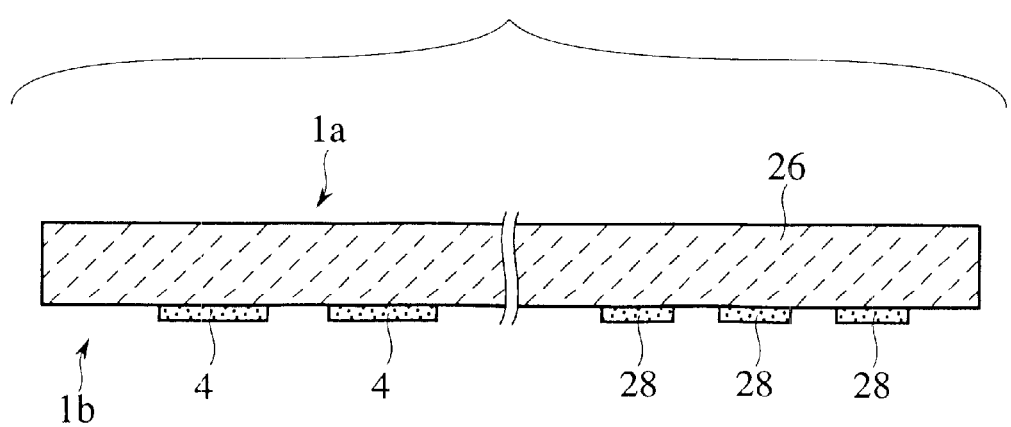

As shown in FIG. 6C, it is also possible that visible information is formed of the indication layer 28 of the same material as the conduction pattern 4. For example, the visible information is printed with an ink with a conductive material, such as graphite or others, so that the function of the conduction patterns 4 and that of the indication layer 28 can be both realized. Concurrently with the formation of the conduction patterns 4 the indication layer 28 of the visible information can be formed.

In the above-described embodiment an adhesive 3 which can adhere the information seal to a product is applied to the pattern side 1b of the information seal 1, but an adhesive may be applied in advance to the region of a product for the information seal 1 to be adhered to. It is also possible to adhere the information seal with an adhesive, a double side tape or others may be separately prepared to adhere the information seal to a product with it in a step of fabricating the product or when the product is shipped.

What is claimed is:

1. A product comprising a plurality of terminals which are electrically connected to an information seal through a conductive pattern, said information seal comprising information recorded visibly on one side of a sheet opposite the side of said conductive pattern which corresponds to the information.

2. A product according to claim 1, comprising a window which is formed in a casing thereof and through which the visible information of the information seal is to be confirmed from the outside.

* * * * *